(12) United States Patent
Nagasawa et al.

(10) Patent No.: US 8,789,847 B2
(45) Date of Patent: Jul. 29, 2014

(54) OCCUPANT PROTECTION DEVICE

(75) Inventors: Isamu Nagasawa, Tokyo (JP); Noriyoshi Baba, Tokyo (JP); Tetsuya Nakase, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/524,500

(22) Filed: Jun. 15, 2012

(65) Prior Publication Data

US 2013/0001936 A1   Jan. 3, 2013

(30) Foreign Application Priority Data

Jun. 30, 2011   (JP) .................................. 2011-146839

(51) Int. Cl.
*B60R 21/203* (2006.01)
*B60R 21/233* (2006.01)

(52) U.S. Cl.
USPC ....................................... 280/731; 280/743.1

(58) Field of Classification Search
USPC ....................................... 280/729, 731, 743.1
See application file for complete search history.

(56) References Cited

U.S. PATENT DOCUMENTS

| | | | |
|---|---|---|---|
| 5,240,283 A * | 8/1993 | Kishi et al. .................... | 280/729 |
| 5,253,892 A * | 10/1993 | Satoh ............................ | 280/731 |
| 5,310,214 A | 5/1994 | Cuevas | |
| 5,358,273 A * | 10/1994 | Onishi et al. ................ | 280/743.1 |
| 5,486,019 A | 1/1996 | Chevroulet et al. | |
| 5,529,337 A * | 6/1996 | Takeda et al. ................ | 280/729 |
| 5,556,128 A | 9/1996 | Sinnhuber et al. | |
| 5,560,649 A * | 10/1996 | Saderholm et al. ........ | 280/743.1 |
| 5,575,497 A | 11/1996 | Suyama et al. | |
| 5,626,359 A | 5/1997 | Steffens et al. | |
| 5,992,875 A | 11/1999 | Cundill | |
| 6,139,052 A | 10/2000 | Preamprasitchai | |
| 6,195,008 B1 | 2/2001 | Bader | |
| 6,290,257 B1 | 9/2001 | Bunce et al. | |
| 6,419,262 B1 | 7/2002 | Fendt et al. | |
| 6,550,804 B2 * | 4/2003 | Burdock ....................... | 280/731 |
| 6,581,961 B1 | 6/2003 | Bowers | |
| 6,594,570 B2 | 7/2003 | Nagao et al. | |
| 6,709,009 B1 | 3/2004 | Michael et al. | |
| 6,893,044 B2 * | 5/2005 | Holmes et al. ............... | 280/731 |
| 7,040,650 B2 | 5/2006 | Neupert et al. | |
| 7,070,201 B2 | 7/2006 | Song et al. | |
| 7,401,807 B2 | 7/2008 | Breed et al. | |
| 7,426,429 B2 | 9/2008 | Tabe | |
| 7,663,502 B2 | 2/2010 | Breed | |

(Continued)

FOREIGN PATENT DOCUMENTS

JP   2006-69384   3/2006
WO   93/16902   9/1993

*Primary Examiner* — Paul N Dickson
*Assistant Examiner* — Timothy Wilhelm
(74) *Attorney, Agent, or Firm* — Smith, Gmabrell & Russell, LLP.

(57) ABSTRACT

There is provided an occupant protection device. An air bag device according to the present invention protects an occupant against an impact caused by a collision of a vehicle by inflating and expanding an air bag body upon the collision, which is housed in a center pad of a steering wheel, the center pad being provided so as not to rotate along with the steering wheel, the air bag body having a first chamber and a second chamber which is configured to be expanded between the occupant and the lower edge of the steering wheel in the vertical direction of the vehicle.

18 Claims, 5 Drawing Sheets

(56) References Cited

U.S. PATENT DOCUMENTS

| | | |
|---|---|---|
| 7,793,973 B2 | 9/2010 | Sato et al. |
| 7,890,263 B2 | 2/2011 | Prakah-Asante et al. |
| 8,179,254 B2 | 5/2012 | Hyde et al. |
| 8,260,502 B2 | 9/2012 | Yonak et al. |
| 8,333,406 B2 | 12/2012 | Slaats |
| 2002/0043789 A1 | 4/2002 | Lichtinger et al. |
| 2004/0163871 A1 | 8/2004 | Nobusawa |
| 2004/0178612 A1 | 9/2004 | Tabe |
| 2005/0184489 A1 | 8/2005 | Kobayashi |
| 2005/0236817 A1 | 10/2005 | Sonoda et al. |
| 2005/0275201 A1 | 12/2005 | Schneider et al. |
| 2006/0163848 A1 | 7/2006 | Abe |
| 2006/0197324 A1* | 9/2006 | Klinkenberger ............... 280/731 |
| 2006/0232050 A1* | 10/2006 | Kumagai et al. ........... 280/730.1 |
| 2006/0244251 A1 | 11/2006 | Muller |
| 2006/0284400 A1 | 12/2006 | Sakakibara et al. |
| 2007/0267852 A1 | 11/2007 | Enders |
| 2008/0054602 A1 | 3/2008 | Yang |
| 2008/0179864 A1 | 7/2008 | Nishizawa |
| 2009/0039625 A1 | 2/2009 | Breed |
| 2009/0121462 A1 | 5/2009 | Rick |
| 2010/0213692 A1 | 8/2010 | Nagai et al. |
| 2012/0065843 A1 | 3/2012 | Thomas et al. |
| 2012/0296567 A1 | 11/2012 | Breed |
| 2013/0001934 A1 | 1/2013 | Nagasawa et al. |
| 2013/0001935 A1 | 1/2013 | Nagasawa et al. |

* cited by examiner

OCCUPANT PROTECTION DEVICE

CROSS-REFERENCE TO RELATED APPLICATIONS

The present application claims priority from Japanese Patent Application No. 2011-146839 filed on Jun. 30, 2011, the entire contents of which are hereby incorporated by reference.

BACKGROUND OF THE INVENTION

1. Field of the Invention

The present invention relates to an occupant protection device, particularly to an occupant protection device in which an air bag body is housed in the center pad of a steering wheel.

2. Description of the Related Art

Conventionally, there has been known an occupant protection device in which an air bag body is folded and housed in the center pad of a steering wheel and is expanded toward the occupant upon the vehicle experiencing an impact so that the occupant is protected against the impact.

Here, the center pad of the steering wheel normally rotates along with the steering wheel in accordance with a driving operation of the occupant. For this reason, the air bag body housed in the center pad is formed so as to be circular so that the air bag body can be inflated and expanded with the same shape for any steering angle of the steering wheel. The air bag body formed in a circular shape mainly protects the head of the occupant.

In recent years, there has been an increasing need for an air bag body housed in a steering wheel, which is capable of protecting not only the head of the occupant, but also other body parts of the occupant sufficiently. Normally, the chest of the occupant is restrained by a seat belt.

Accordingly, a strong pressure may be applied to the chest upon the vehicle experiencing an impact, and thus there has been an increasing need for protecting the chest of the occupant sufficiently by reducing the pressure applied to the chest upon the impact.

As a device capable of protecting not only the head of the occupant but also other body parts of the occupant, for example, Japanese Unexamined Patent Application Publication (JP-A) No. 2006-069384 discloses an air bag device for an automobile, in which an air bag body is mounted on a center pad configured not to rotate, the air bag body being formed in such a manner as to include a head protection portion, a chest protection portion, and an abdomen protection portion.

In JP-A No. 2006-069384, the air bag body is housed in the center pad which is configured not to rotate, and thus the shape of the air bag can be decided upon in advance, and accordingly, the air bag body protects not only the head of the occupant but also the chest and abdomen of the occupant. However, for example, there is room for improvement regarding the way in which the waist and legs of the occupant are restrained.

Accordingly, with the air bag device in the JP-A No. 2006-069384, the knees of the occupant may be raised in the upward vertical direction of the vehicle upon the vehicle experiencing an impact. A phenomenon that the knees of the occupant are raised in this manner upon the vehicle experiencing an impact is what is called a submarine phenomenon. With the air bag device in the JP-A No. 2006-069384, the submarine phenomenon may cause the chest of the occupant to be compressed.

As described above, the air bag body in the JP-A No. 2006-069384 is expanded between the steering wheel and the chest of the occupant so as to protect the chest of the occupant. The air bag body, however, is not inflated and expanded between the legs of the occupant and the lower edge of the steering wheel in the vertical direction of the vehicle.

Here, for example, in a vehicle such as a full cab or semi cab vehicle, the steering wheel may move toward the front side of the vehicle along with the steering shaft upon the vehicle experiencing an impact. Accordingly, in a vehicle such as a full cab or semi cab vehicle, the chest of the occupant may be urged and pressed against the lower edge of the steering wheel upon the vehicle experiencing an impact.

As described above, the air bag device in the JP-A No. 2006-069384 protects the head as well as the chest and abdomen of the occupant, however, the air bag body is not inflated and expanded so as to cover the lower edge of the steering wheel in the vertical direction of the vehicle, and thus there is room for improvement in reducing the pressure applied to the chest and improving the safety of the occupant.

SUMMARY OF THE INVENTION

In view of the above-described conventional situation, it is an object of the present invention to provide an occupant protection device that is capable of improving the safety of the occupant to be protected against an impact experienced by the vehicle by reducing the pressure applied to the chest of the occupant upon the vehicle experiencing the impact.

In order to achieve such improvements, a first aspect of the present invention provides an occupant protection device that protects an occupant against an impact caused by a collision of a vehicle by inflating and expanding an air bag body upon the collision, which is housed in a center pad of a steering wheel, wherein the center pad is provided so as not to rotate along with the steering wheel, and the air bag body has a plurality of chambers, one of which being configured to be expanded between the occupant and the lower edge of the steering wheel in the vertical direction of the vehicle. Thus, the pressure applied to the chest upon the vehicle experiencing an impact can be reduced, and the safety of the occupant to be protected against the impact to the vehicle can be improved.

The one of the chambers of the air bag body of the occupant protection device may be expanded from the steering wheel toward the occupant.

The one of the chambers of the air bag body of the occupant protection device may be expanded so as to cover the lower edge of the steering wheel in the vertical direction of the vehicle.

The one of the chambers of the air bag body of the occupant protection device may be expanded from under the steering wheel toward the occupant.

In addition, the one of the chambers of the air bag body of the occupant protection device according to the present invention is configured to be expanded from behind the steering wheel toward the occupant.

DETAILED DESCRIPTION OF THE INVENTION

Hereinafter, an embodiment of the present invention will be described with reference to the drawings. An air bag device (occupant protection device) 10 which is an embodiment of the present invention is housed in a center pad 7 of a steering wheel 3. The center pad 7 of the steering wheel 3 is configured not to rotate.

Because the air bag device 10 is housed in the center pad 7 which is configured not to rotate, the shape of an air bag body 11, which is capable of being inflated and expanded toward the occupant upon the vehicle experiencing an impact, can be decided upon in advance.

Embodiment 1

Figure 1:
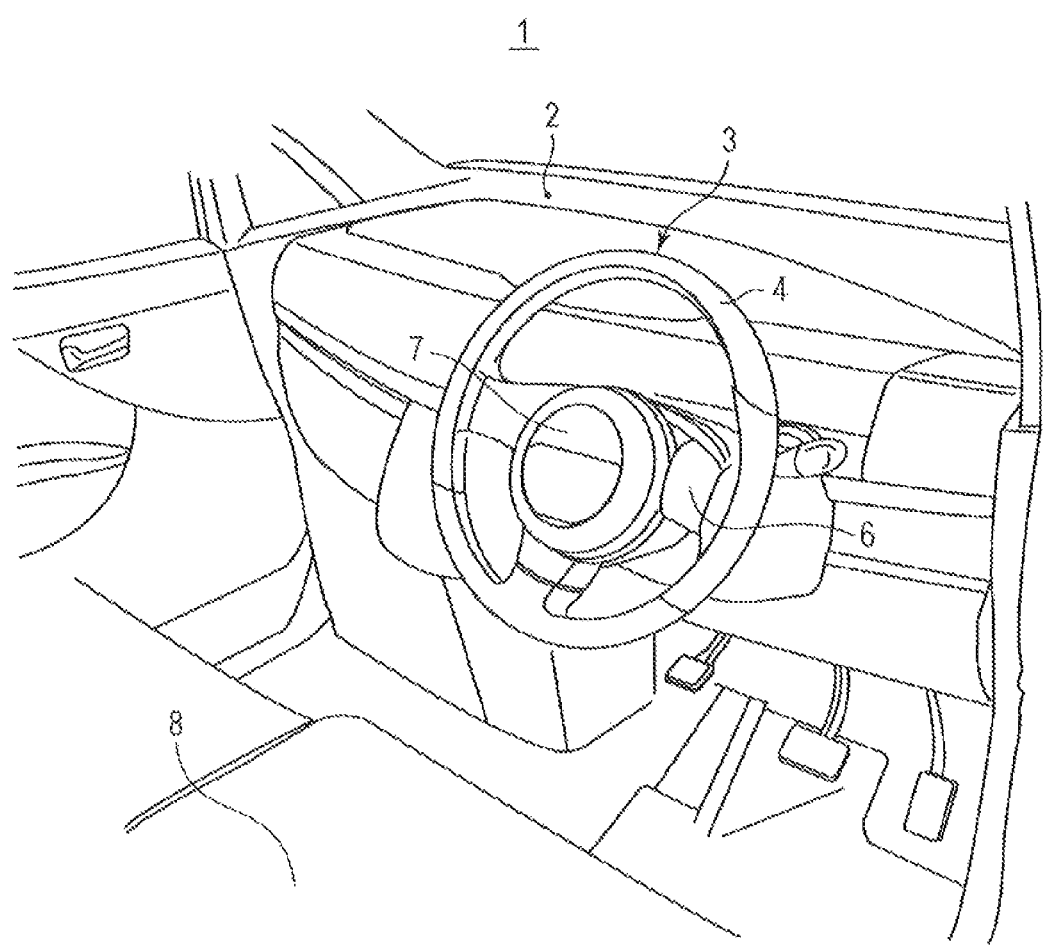
FIG. 1 is a perspective view schematically illustrating a cabin of a vehicle in which an occupant protection device as an embodiment of the present invention is mounted, the view of the cabin being taken from the rear of the vehicle toward the front.

First, a steering wheel 3 of a vehicle 1 in which an air bag device 10 as an embodiment of the present invention is mounted is described with reference to FIG. 1. FIG. 1 is a perspective view schematically illustrating a cabin 2 of the vehicle 1 in which the occupant protection device 10 as an embodiment of the present invention is mounted, the view of the cabin 2 being taken from the rear of the vehicle toward the front.

As illustrated in FIG. 1, the steering wheel 3 of the present embodiment includes a ring-shaped rim 4 which forms the outer circumference of the steering wheel 3, spokes 6 which connects between the rim 4 and a steering shaft 5, and a center pad 7 which is supported by the steering shaft 5, independently and separately from the steering shaft 5 so as to be non-rotatable.

That is to say, the center pad 7 of the present embodiment is configured not to rotate and is not connected to a steering angle operation of the rim 4 made by an occupant M. The air bag device 10 is housed inside the center pad 7.

The air bag device 10 includes an inflator (not shown) as a gas blowing unit, and an air bag body 11 which is disposed so as to be connected to the inflator so as to be expanded by the gas blown through the inflator.

Here, in the case where the center pad 7 of the steering wheel 3 is configured to be rotatable in a conventional manner, the air bag body 11 housed in the center pad 7 is formed so as to be circular so as to be able to cope with any steering angle of the steering wheel 3.

On the other hand, as described above, the steering wheel 3 of the present embodiment is configured such that the center pad 7 is non-rotatable, thus the shape of the air bag body 11 housed in the center pad 7 can be decided upon in advance.

Figure 2:
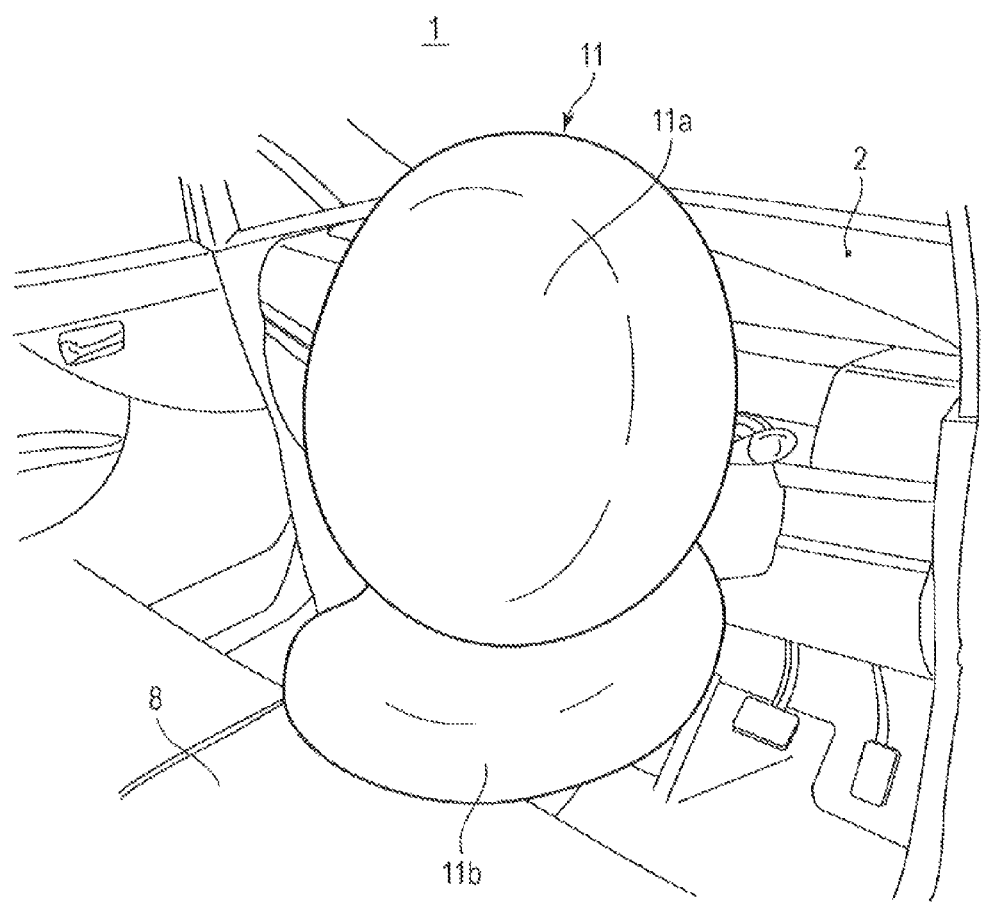
FIG. 2 is a perspective view, based on FIG. 1, illustrating an air bag body of the occupant protection device when inflated and expanded.

The air bag body 11 of the air bag device 10 is described with reference to FIGS. 2 and 3. FIG. 2 is a perspective view, based on FIG. 1, illustrating the air bag body 11 of the occupant protection device 10 when inflated and expanded.

Figure 3:
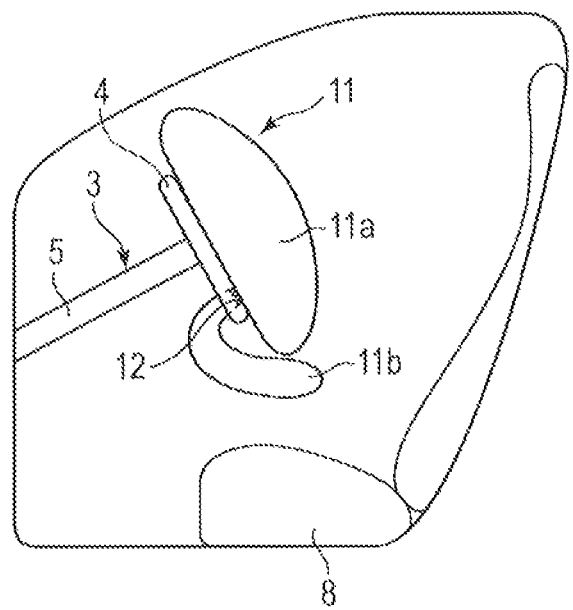
FIG. 3 is a side view schematically illustrating the cabin of the vehicle in which the occupant protection device as the embodiment of the present invention is mounted, the view of the cabin being taken from one side of the vehicle in a vehicle width direction, and illustrating the air bag body of the occupant protection device when inflated and expanded.

FIG. 3 is a side view schematically illustrating the cabin 2 of the vehicle 1 in which the occupant protection device 10 as the embodiment of the present invention is mounted, the view of the cabin 2 being taken from one side of the vehicle in a vehicle width direction, and illustrating the air bag body 11 of the occupant protection device 10 when inflated and expanded.

As illustrated in FIGS. 2 and 3, the air bag body 11 of the present embodiment includes a first chamber (head protection portion) 11a which is capable of being inflated and expanded from the steering wheel 3 toward the occupant M, and a second chamber (leg protection portion) 11b which is capable of being inflated and expanded from the front toward the rear in the vehicle front-rear direction.

As described above, the air bag body 11 having the first chamber 11a and the second chamber 11b, further includes a pressure valve 12 in a communicating portion between the first chamber 11a and the second chamber 11b.

The pressure valve 12 is composed of a base cloth which is thinner than the cloth of which the air bag body 11 is composed. For this reason, the pressure valve 12 is designed to be opened when gas is supplied to the air bag body 11 by the inflator and the pressure within the first chamber 11a is increased to a high level. The gas discharged by the inflator is then supplied to the second chamber 11b from the first chamber 11a via the pressure valve 12.

As described above, the air bag device 10 of the present embodiment includes an inflator in the first chamber 11a, however, the inflator may be disposed in the second chamber 11b so that the second chamber 11b is inflated and expanded first.

In the air bag device 10 of the present embodiment, the first chamber 11a and the second chamber 11b are inflated and expanded by a single inflator, however, without being limited to this, an inflator may be disposed in each of the first chamber 11a and the second chamber 11b.

The air bag device 10 of the present embodiment is configured with the single air bag body 11 having the first chamber 11a and the second chamber 11b, however, without being limited to this, the air bag device 10 may be configured with a plurality of air bag bodies 11, and an inflator may be disposed in each air bag body 11.

The air bag body 11 of the air bag device 10 in the present embodiment includes the pressure valve 12 disposed in a communicating portion which communicates with the first chamber 11a and the second chamber 11b, however, without being limited to this, the first chamber 11a and the second chamber 11b may be inflated and expanded almost simultaneously without disposing the pressure valve 12, for example.

In this manner, as an inflation and expansion mode of the first chamber 11a to which gas is supplied by the inflator, the first chamber 11a is formed so as to be capable of being inflated and expanded from the center pad 7 of the steering wheel 3 toward the occupant M.

In the present embodiment, the first chamber 11a is formed so as to be circular when viewed from the rear toward the front in the vehicle front-rear direction. The first chamber 11a is formed so as to be substantially the same size as the steering wheel 3.

In addition, the first chamber 11a is formed so as to be elliptical when viewed in the vehicle width direction. That is to say, the first chamber 11a is formed so as to have an elliptical shape, and serves to mainly protect the head of the occupant M.

As described above, the first chamber 11a of the present embodiment is formed so as to be of such a size as to protect the head of the occupant M, however, without being limited to such a size, the first chamber 11a may be formed so as to have a size allowing the chest of the occupant M to be protected as long as the size causes no interference with other members in the cabin when the first chamber 11a is inflated and expanded.

On the other hand, the second chamber 11b is formed so as to be capable of being inflated and expanded between the lower edge of the steering wheel 3 and the legs of the occupant M in the vertical direction of the vehicle. The second chamber 11b is formed so as to be elliptical when viewed from the rear toward the front in the vehicle front-rear direction.

In addition, the second chamber 11b is formed so as to be capable of being inflated and expanded from the front toward the rear in the vehicle front-rear direction when the second chamber 11b is viewed in the vehicle width direction. That is to say, the second chamber 11b is formed so as to be capable of being inflated and expanded between the legs of the occupant M and the lower edge of the steering wheel 3 in the vertical direction of the vehicle.

In this manner, the second chamber 11b of the present embodiment is formed so as to be capable of being inflated and expanded between the lower edge of the steering wheel 3 and the legs of the occupant M, thereby being able to fill the space between the lower edge of the steering wheel 3 and the legs of the occupant M.

Furthermore, the second chamber 11b of the present embodiment is formed so as to be capable of being inflated and expanded from the lower edge of the steering wheel 3 toward the occupant M in the vertical direction of the vehicle. Therefore, the second chamber 11b, when being inflated and expanded, is capable of urging the occupant M against a seat 8.

In this manner, the second chamber 11b of the present embodiment is inflated and expanded so as to urge the legs of the occupant M against the seat 8 upon the vehicle 1 experiencing an impact, thus, a phenomenon that the knees of the occupant M are raised, i.e., what is called a submarine phenomenon can be prevented.

Because the second chamber 11b of the present embodiment is inflated and expanded so as to urge the legs as well as the crotch of the occupant M against the seat 8 upon the vehicle 1 experiencing an impact, the crotch of the occupant M, and further the lower half body of the occupant M are pressed down against the seat 8, and thus what is called a submarine phenomenon can be prevented.

Accordingly, the air bag device 10 of the present embodiment can reduce a forward moving distance of the occupant M in the vehicle front-rear direction upon the vehicle 1 experiencing an impact, and thereby it is possible to reduce the pressure applied to the chest of the occupant M via a seat belt 9.

As described above, according to the air bag device 10 of the present embodiment, the pressure applied to the chest of the occupant upon the vehicle 1 experiencing an impact can be reduced, and the safety of the occupant to be protected against an impact experienced by the vehicle 1 can be improved.

Figure 4:
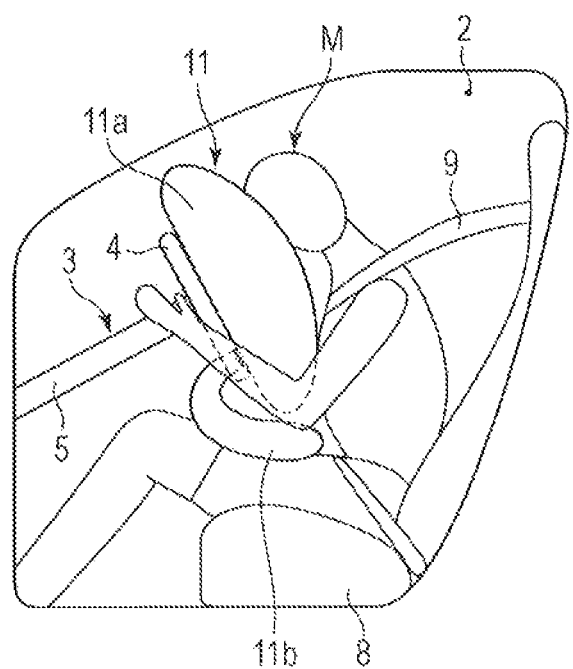
FIG. 4 is a side view, based on FIG. 3, illustrating an effect of the air bag body on an occupant upon the vehicle experiencing an impact.

Next, the effect of the air bag body 11 on the occupant M upon the vehicle 1 experiencing an impact in which the air bag device 10 of the present embodiment is mounted will be described with reference to FIG. 4. FIG. 4 is a side view, based on FIG. 3, illustrating the effect of the air bag body on the occupant upon the vehicle experiencing an impact.

As illustrated in FIG. 4, the second chamber 11b of the air bag body 11 of the present embodiment is inflated and expanded toward the legs of the occupant upon the vehicle 1 experiencing an impact. At this moment, the second chamber 11b is inflated and expanded so as to fill the space between the legs of the occupant and the lower edge of the steering wheel 3.

Thus, the second chamber 11b of the air bag body 11 of the present embodiment is inflated and expanded so as to fill the space between the legs of the occupant and the lower edge of the steering wheel 3, thereby being able to reduce a forward moving distance of the occupant M in the vehicle front-rear direction upon the vehicle 1 experiencing an impact.

At the moment of the impact, the second chamber 11b is inflated and expanded toward the occupant M. Accordingly, the second chamber 11b is capable of urging the occupant M against the seat 8 upon the vehicle 1 experiencing an impact.

Consequently, according to the air bag device 10 of the present embodiment, the occupant M can be urged against the seat 8, and thus a phenomenon that the waist and the legs of the occupant M are raised, i.e., what is called a submarine phenomenon can be prevented, and thereby it is possible to reduce the pressure applied to the chest of the occupant via the seat belt 9.

As described above, according to the air bag device 10 of the present embodiment, the pressure applied to the chest of the occupant M upon the vehicle 1 experiencing an impact can be reduced, and the safety of the occupant to be protected against an impact experienced by the vehicle 1 can be improved.

Embodiment 2

Figure 5:
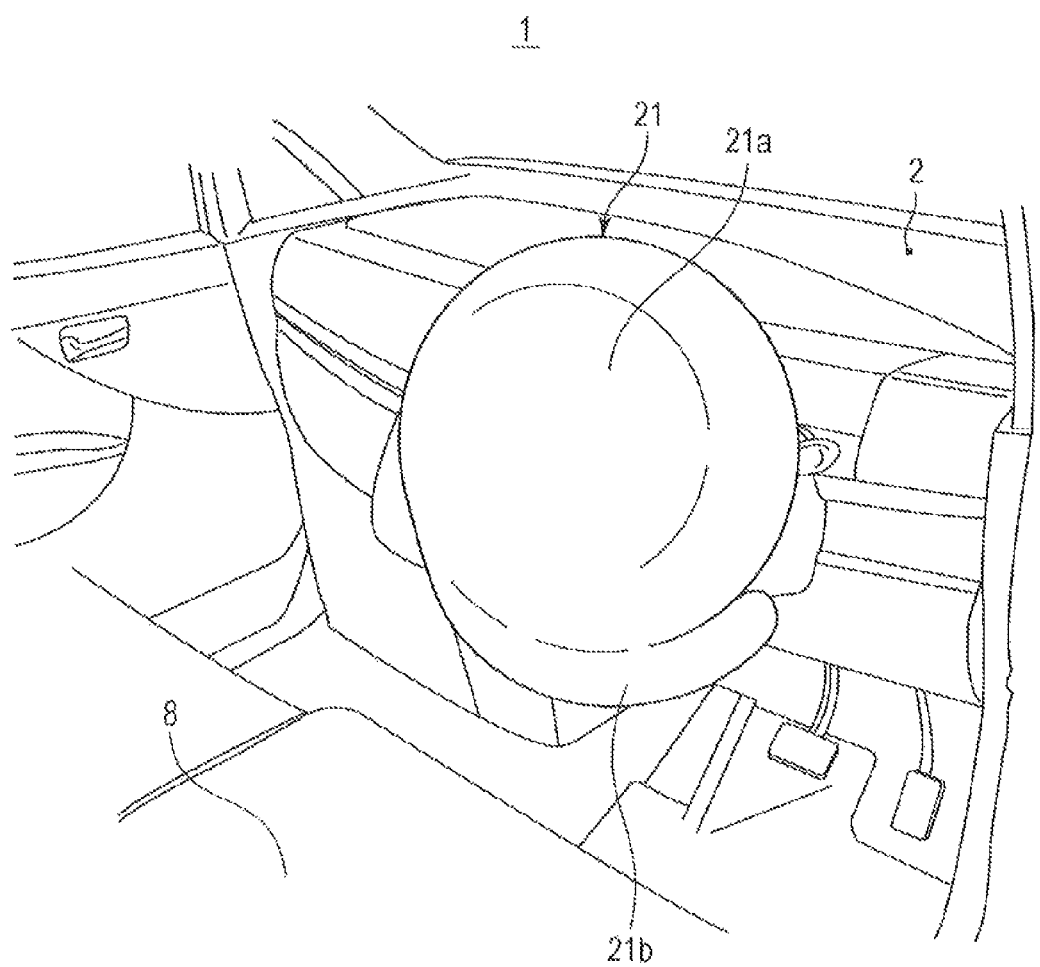
FIG. 5 is a perspective view schematically illustrating the cabin of the vehicle in which an occupant protection device as another embodiment of the present invention is mounted, the view of the cabin being taken from the rear of the vehicle toward the front in a state where an air bag body of the occupant protection device is inflated and expanded.

Next, another embodiment of the present invention is described with reference to FIGS. 5 and 6. FIG. 5 is a perspective view schematically illustrating the cabin 2 of the vehicle 1 in which an occupant protection device 20 as another embodiment of the present invention is mounted, the view of the cabin 2 being taken from the rear of the vehicle toward the front in a state where an air bag body 21 of the occupant protection device 20 is inflated and expanded.

Figure 6:
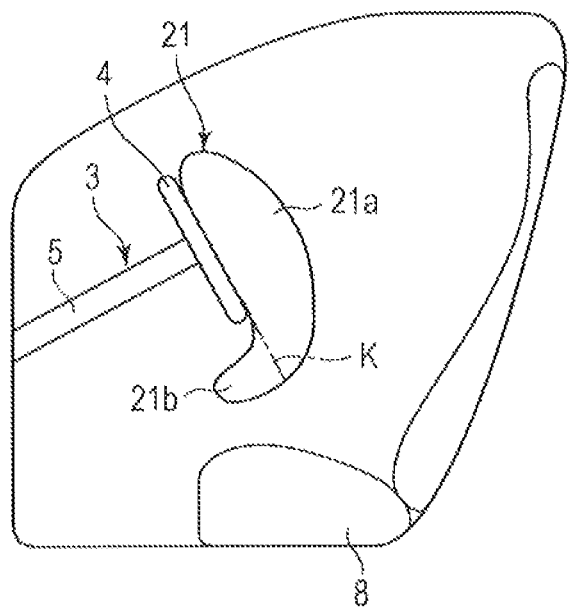
FIG. 6 is a side view schematically illustrating the cabin of the vehicle in which the occupant protection device as another embodiment of the present invention is mounted, the view of the cabin being taken from one side of the vehicle in the vehicle width direction, and illustrating the air bag body of the occupant protection device when inflated and expanded.

FIG. 6 is a side view schematically illustrating the cabin 2 of the vehicle 1 in which the occupant protection device 20 as another embodiment of the present invention is mounted, the view of the cabin 2 being taken from one side of the vehicle 1 in the vehicle width direction, and illustrating the air bag body of the occupant protection device 20 when inflated and expanded.

As illustrated in FIGS. 5 and 6, the air bag device 20 of the present embodiment has a shape different from that of the air bag device 10 of the above-described Embodiment 1, but shares the same features with the air bag device 10 in all other respects. Therefore, the portions of Embodiment 2 that are the same as or correspond to the above-described Embodiment 1 are labeled with the same reference symbols, and description thereof is omitted.

As illustrated in FIGS. 5 and 6, the air bag body 21 of the air bag device 20 of the present embodiment includes a first chamber 21a which is capable of being inflated and expanded from the steering wheel 3 toward the occupant M, and a second chamber (one of the chambers) 21b which is capable of being inflated and expanded between the occupant M and the lower edge of the steering wheel 3 in the vertical direction of the vehicle.

The air bag body 21 forms the first chamber 21a and the second chamber 21b with a single space. That is to say, the air bag body 21 inflates and expands the first chamber 21a and the second chamber 21b almost simultaneously triggered by a gas supply from an inflator.

As described above, the air bag body 21 forms the first chamber 21a and the second chamber 21b with a single space, however, without being limited to this, a pressure valve may be provided between the first chamber 21a and the second chamber 21b, for example.

In the present embodiment, the second chamber 21b is formed so as to be capable of being inflated and expanded to cover the lower edge of the rim 4 of the steering wheel 3 in the vertical direction of the vehicle. The second chamber 21b is formed so as to be semi-elliptical when viewed from the rear toward the front in the vehicle front-rear direction.

In addition, the second chamber 21b is formed so as to be elliptical when viewed in the vehicle width direction. That is to say, the second chamber 21b is formed so as to be capable of being inflated and expanded to cover the lower edge of the rim 4 of the steering wheel 3 in the vertical direction of the vehicle.

In this manner, the second chamber 21b of the present embodiment is formed so as to be capable of being inflated and expanded to cover the lower edge of the rim 4 of the steering wheel 3 in the vertical direction of the vehicle, and thus the pressure to the occupant due to the lower edge of the rim 4 in the vertical direction of the vehicle can be reduced.

Figure 7:
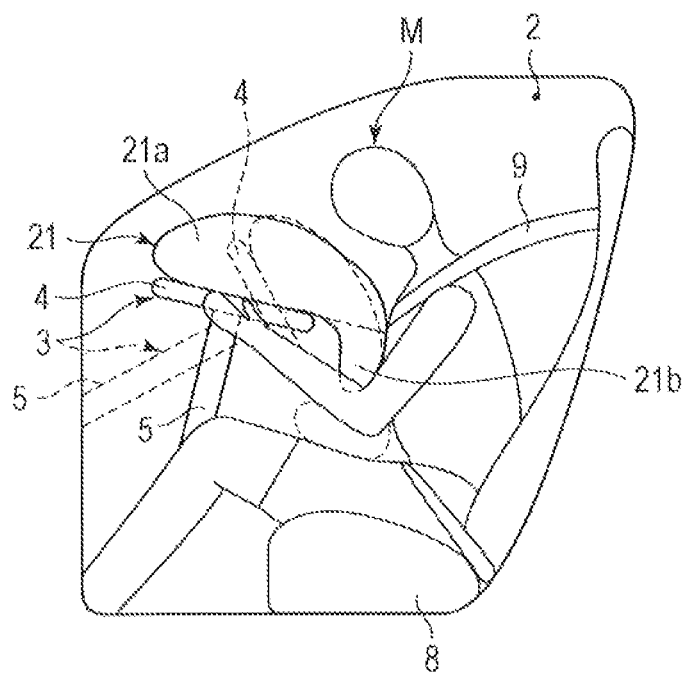
FIG. 7 is a side view, based on FIG. 6, illustrating an effect of the air bag body on the occupant upon the vehicle experiencing an impact.

Next, the effect of the air bag body 21 on the occupant upon the vehicle 1 experiencing an impact in which the air bag device 20 of the present embodiment is mounted will be described with reference to FIG. 7. FIG. 7 is a side view, based on FIG. 6, illustrating the effect of the air bag body 21 on the occupant upon the vehicle 1 experiencing an impact.

As illustrated in FIG. 7, the second chamber 21b of the air bag body 21 of the present embodiment is inflated and expanded so as to cover the lower edge of the steering wheel 3 in the vertical direction of the vehicle upon the vehicle 1 experiencing an impact.

In the case where a conventional air bag device is mounted on the vehicle 1, the steering wheel 3 may move toward the front side of the vehicle along with the steering shaft 5 (not shown) of the steering wheel 3 upon the vehicle 1 experiencing an impact.

Accordingly, the lower edge of the steering wheel 3 in the vertical direction of the vehicle may press against the chest of the occupant upon the vehicle 1 experiencing an impact. In this manner, in the case where a conventional air bag device is mounted on the vehicle 1, the chest of the occupant may be pressed.

On the other hand, as described above, the second chamber 21b of air bag body 21 of the present embodiment is inflated and expanded so as to cover the lower edge of the steering wheel 3 in the vertical direction of the vehicle upon the vehicle 1 experiencing an impact, thus the pressure applied to the chest of the occupant can be reduced.

In this manner, the air bag device 20 of the present embodiment can reduce the pressure applied to the chest of the occupant, thus the safety against an impact to the vehicle 1 can be improved.

According to air bag device 20 of the present embodiment, reduction in the pressure applied to the chest of the occupant is achieved by only the air bag body 21 housed in the steering wheel 3. Therefore, the air bag device 20 of the present embodiment can reduce the pressure applied to the chest of the occupant without requiring an air bag device for covering the lower edge of the steering wheel 3 in the vertical direction of the vehicle. Consequently, protection of the occupant M against an impact to the vehicle can be achieved with a low cost.

What is claimed is:

1. An occupant protection device which protects an occupant against an impact caused by a collision of a vehicle by inflating an air bag body upon occurrence of the collision, the air bag body being housed in a center pad of a steering wheel, wherein
   the center pad is provided so as not to rotate along with the steering wheel,
   the air bag body includes a plurality of chambers, one of the plurality of chambers being configured to be inflated from behind the steering wheel toward the occupant through a space extending from the occupant's legs to a lower edge of the steering wheel in a vertical direction of the vehicle so as to urge the occupant's legs downward into a seat, and
   the one of the plurality of chambers is configured to inflate to fill the space between the legs of the occupant and the lower edge of the steering wheel so as to reduce a forward moving distance of the occupant in the vehicle front-rear direction upon the vehicle experiencing an impact.

2. The occupant protection device according to claim 1, wherein the one of the plurality of chambers of the air bag body is configured to be inflated so as to cover a lower edge of the steering wheel in a vertical direction of the vehicle.

3. The occupant protection device according to claim 1, wherein the one of the plurality of chambers of the air bag body is configured to be inflated from under the steering wheel toward the occupant.

4. The occupant protection device according to claim 1, wherein the one of the plurality of chambers of the air bag body is configured to vertically fill the space extending from the occupant's legs to a lower edge of the steering wheel.

5. The occupant protection device according to claim 1, wherein the one of the plurality of chambers of the air bag body is configured to be inflated so as to urge the legs of the occupant against the seat upon the vehicle experiencing an impact, so as to counteract an occupant's submarining upon collision.

6. The occupant protection device according to claim 1, wherein the one of the plurality of chambers of the air bag body is configured to inflate at impact of the collision.

7. An occupant protection device which protects an occupant against an impact caused by a collision of a vehicle by inflating an air bag body upon occurrence of the collision, the air bag body being housed in a center pad of a steering wheel, wherein
   the center pad is provided so as not to rotate along with the steering wheel, and
   the air bag body includes a plurality of chambers, one of the plurality of chambers being configured to inflate at impact of the collision, and to be inflated from behind the steering wheel and toward the occupant through a space extending from the occupant's legs to a lower edge of the steering wheel in a vertical direction of the vehicle.

8. The occupant protection device according to claim 7, wherein the one of the plurality of chambers of the air bag body is configured to be inflated so as to cover a lower edge of the steering wheel in a vertical direction of the vehicle.

9. The occupant protection device according to claim 7, wherein the one of the plurality of chambers of the air bag body is configured to be inflated from under the steering wheel toward the occupant.

10. The occupant protection device according to claim 7, wherein the one of the plurality of chambers of the air bag body is configured to vertically fill the space extending from the occupant's legs to a lower edge of the steering wheel.

11. The occupant protection device according to claim 7, wherein the one of the plurality of chambers of the air bag body is configured to be inflated so as to urge the legs of the occupant against the seat upon the vehicle experiencing an impact, so as to counteract an occupant's submarining upon collision.

12. The occupant protection device according to claim 7, wherein the one of the plurality of chambers of the air bag body is configured to urge the occupant's legs downward into the seat.

13. An occupant protection device which protects an occupant against an impact caused by a collision of a vehicle by inflating an air bag body upon occurrence of the collision, the air bag body being housed in a center pad of a steering wheel, wherein the center pad is provided so as not to rotate along with the steering wheel, and the air bag body includes a plurality of chambers, one of the plurality of chambers being configured to be inflated from behind the steering wheel toward the occupant and through a space extending from the occupant's legs to a lower edge of the steering wheel in a vertical direction of the vehicle so as to urge the occupant's legs downward into a seat, the one of the plurality of chambers is configured to inflate without reliance on a compressive force being applied against any of the remaining plurality of chambers.

14. The occupant protection device according to claim 13, wherein the one of the plurality of chambers of the air bag body is configured to be inflated so as to cover a lower edge of the steering wheel in a vertical direction of the vehicle.

15. The occupant protection device according to claim 13, wherein the one of the plurality of chambers of the air bag body is configured to be inflated from under the steering wheel toward the occupant.

16. The occupant protection device according to claim 13, wherein the one of the plurality of chambers of the air bag body is configured to vertically fill the space extending from the occupant's legs to a lower edge of the steering wheel.

17. The occupant protection device according to claim 13, wherein the one of the plurality of chambers of the air bag body is configured to be inflated so as to urge the legs of the occupant against the seat upon the vehicle experiencing an impact, so as to counteract an occupant's submarining upon collision.

18. The occupant protection device according to claim 13, wherein the one of the plurality of chambers of the air bag body is configured to inflate at impact of the collision.

\* \* \* \* \*